United States Patent

[11] 3,577,690

[72] Inventor William M. Catron
6900 Northwest 6th Court, Plantation, Fla. 33311
[21] Appl. No. 861,533
[22] Filed Aug. 4, 1969
Division of Ser. No. 688,454, Dec. 6, 1967
[45] Patented May 4, 1971

[54] METHOD OF MAKING ONE-PIECE MULTIFOCAL LENS BLANKS
2 Claims, 16 Drawing Figs.
[52] U.S. Cl............................................ 51/284, 51/277
[51] Int. Cl............................................. B24b 1/00
[50] Field of Search.................................. 51/277, 284; 351/168, 171, 177

[56] References Cited
UNITED STATES PATENTS

| | | | |
|---|---|---|---|
| 1,426,147 | 8/1922 | Bugbee | 51/284X |
| 1,482,951 | 2/1924 | Stead | 51/284X |
| 1,881,982 | 10/1932 | Uhlemann | 351/168 |
| 2,007,366 | 7/1935 | Clement | 51/277 |
| 2,050,755 | 8/1936 | Hurst et al. | 351/168 |
| 2,743,649 | 5/1956 | Phillips | 351/171 |
| 2,847,804 | 8/1958 | Calkins et al. | 51/284 |
| 3,066,458 | 12/1962 | Catron et al. | 351/177X |

Primary Examiner—Lester M. Swingle
Attorney—Kane, Dalsimer, Kane, Sullivan & Kurucz ABSTRACT: The method of manufacturing a multifocal lens blank which may finally be processed into a prescription lens having reading and distance portions separated by a shoulder extending the width of the lens, wherein a plurality of optical glass workpieces, specially shaped for efficient further processing, are blocked about the circumferential edge of a blocking wheel and auxiliary slabs of optical glass are provided in the spaces between adjacent pieces. During the grinding and polishing operations, which are performed on the workpieces to transform them to lens blanks, the auxiliary slabs provide the additional support needed by the processing tools to form relatively undistorted lens surfaces.

INVENTOR
WILLIAM M. CATRON
BY
ATTORNEYS

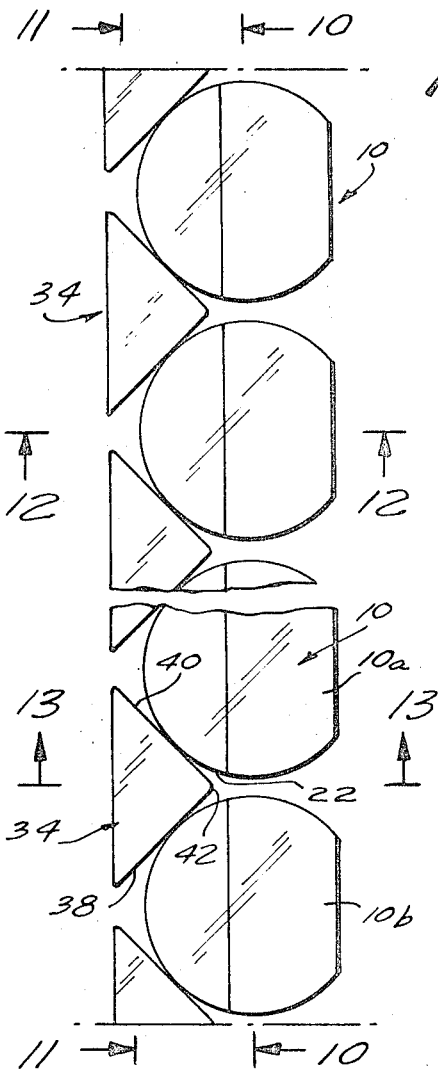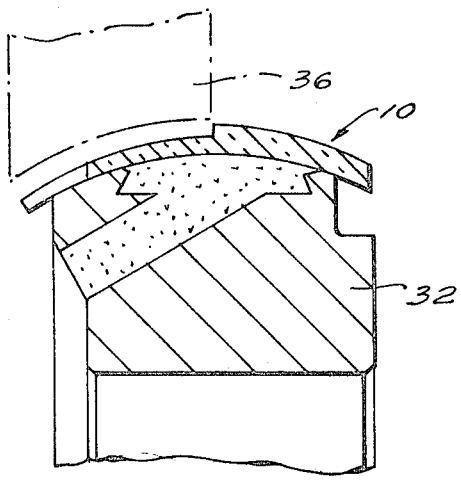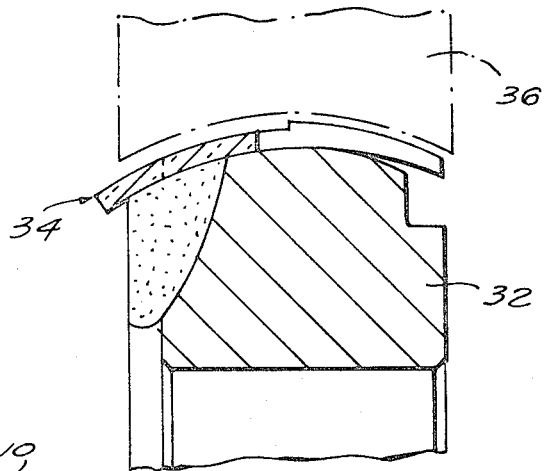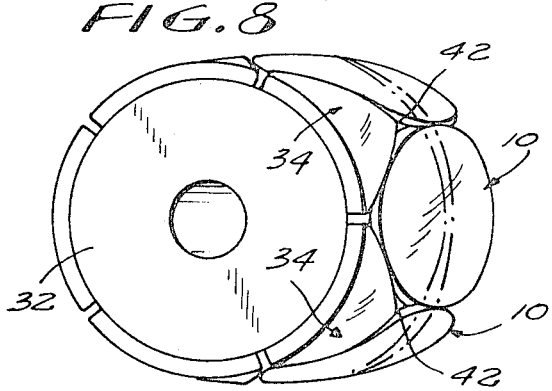

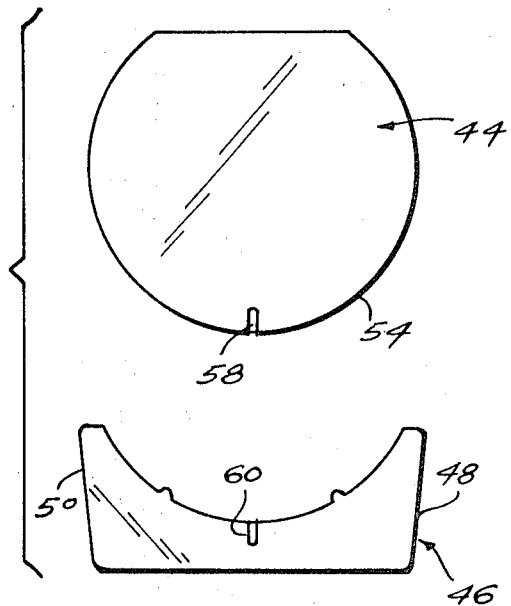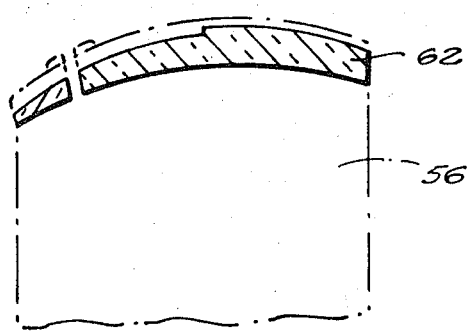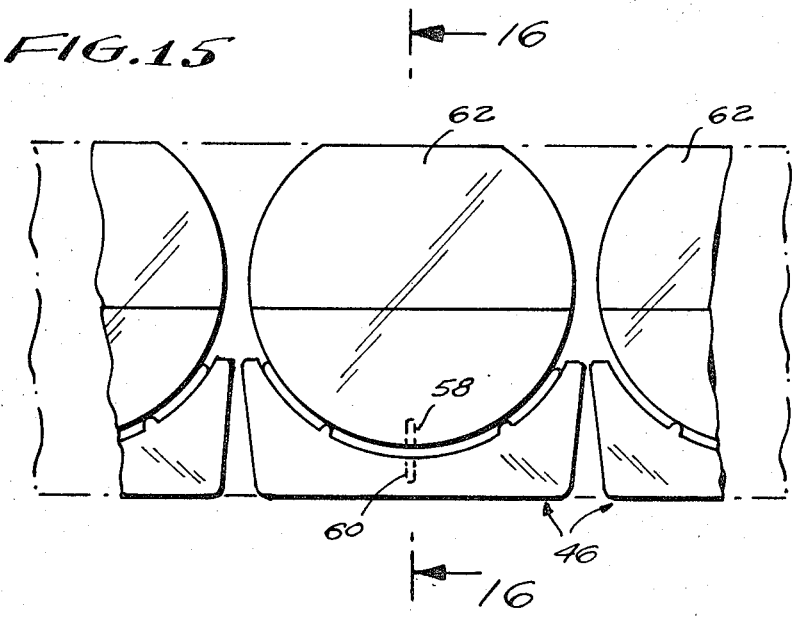

METHOD OF MAKING ONE-PIECE MULTIFOCAL LENS BLANKS

CROSS REFERENCE TO RELATED APPLICATION

This application is a division of my application Ser. No. 688,454, filed Dec. 6, 1967.

BACKGROUND OF THE INVENTION

Heretofore, the typical blank used in the optical industry for the manufacture of one-piece, multifocal lenses of the type having a reading portion and distance portion formed on the front surface and a separating ledge or shoulder at each field of vision juncture has been confined to a substantially square or rectangular shape. The typical prior art process for preparing such lens blanks is disclosed in U.S. Pat. No. 3,066,458 and the prior art blank is depicted in FIG. 2 of said patent.

The reason for the particular shape of the prior art blank is that during the preparation of the blanks, the workpieces from which the blanks are produced are mounted about the circumferential periphery of a blocking wheel which is rotated while grinding and polishing operations are performed to form the semifinished blanks. The performance of these grinding and polishing operations requires that the abrading surface of the processing tool be brought to bear on the rotating blanks in order to impart thereto the desired radii of curvature. The processing tool is biased toward the center of the blocking wheel and the grinding surface rests upon the workpieces. If there is substantial space between adjacent workpieces, either the tool would slip or fall into the space, thereby preventing further grinding or polishing, or an aberrated surface would result from the varying unit pressures exerted by the grinding or polishing tool as the pattern of glass area under the tool changed with the rotation of the blocking wheel. In order to minimize any spacing or gaps between adjacent workpieces, the prior art required the use of a straight-sided square or rectangular workpiece which could be closely abutted against the workpiece adjacent it. Suitable additional slabs were required to fill the gaps between workpieces in those usual instances when the diameter of the blocking wheel and the width of the workpiece were not such as to permit complete encirclement of the blocking wheel circumferential edge by a whole number of pieces. Round or semiround workpieces could not be used in accordance with prior art teachings since they would tend to produce too great a gap in the cusp formed between adjacent pieces.

The square or rectangular semifinished blank in accordance with the prior art teachings presents many difficulties to the prescription laboratory which must ultimately produce the lens by processing the underside of the semifinished blank according to some desired prescription. The principal difficulty is based on the fact that the optical and geometric center of the rectangular blanks don not coincide and hence when the blank is blocked on the optical center, there is an uneven distribution of glass about the blank. This uneven glass distribution causes pressure variations to occur during the grinding and polishing of the under side of the blank which, in turn, may result in the optical center drifting from its prescribed location. Also, during the under side processing of the rectangular blank, those portions which extend far out from the block are ground to a substantial knife edge resulting in a lens which is both hazardous and extremely fragile and subject to breakage.

To overcome the above described difficulties, the prescription laboratory must in some manner preform the edge of the blank before it is processed. This is generally done by cribbing or breaking off the extra portions of glass that extend far beyond the lens block. This operation is both time consuming and costly and also produces a blank with dangerously jagged edges.

SUMMARY OF THE INVENTION

It is, therefore, the primary object of the present invention to provide an improved method for producing multifocal lens blanks of the above type from round, partly round, or truncated round optical glass workpieces to thereby enable the use of such desirable blanks in the prescription laboratory.

In accordance with the present invention, this object is attained by supporting and securing a plurality of unfinished optical glass workpieces having the desired round or semiround configuration about the circumferential edge of a blocking wheel in a suitable manner. Similarly, auxiliary slabs of optical glass having substantially the same thickness and front and underside radii of curvature as the workpieces, and having a configuration which is such as to fill the space between adjacent workpieces, are secured to the wheel in the spaces between adjacent workpieces. Grinding and polishing operations are then carried on to produce semifinished lens blanks. When the processing is completed, the blanks and slabs are removed from the wheel and the slabs are discarded. The lens blank so produced and having the desired nonrectangular configuration is then forwarded to the prescription laboratory to undergo further processing in accordance with any particular prescription.

As an alternative method of producing the nonrectangular blanks, the auxiliary slab may be initially bonded to a workpiece and thereafter the combined piece and slab are secured to the blocking wheel in a standard manner. After grinding and polishing, the bonding material may be removed, separating the blank and slab, and the slab may be discarded, leaving the lens blank ready for delivery to the prescription lab. In this case the configuration of the slab would have to be such as to complement that of the preferred blank shape so as to permit a combined workpiece and slab to substantially abut against a similarly combined workpiece and slab unit when both are mounted on a blocking wheel. The dimension of the slab should also be chosen so as to allow the peripheral edge of the wheel to be covered by a whole number of units without requiring the use of an odd-shaped end piece between the last and first units.

DESCRIPTION OF THE DRAWINGS

In the accompanying drawings:

FIG. 8 is a perspective view of a blocking wheel upon which a plurality of lens blanks are being ground in accordance with the present invention depicting the relative positions of the workpieces and auxiliary slabs;

FIG. 9 is a developed view of the peripheral surface of the lens blocking wheel of FIG. 8;

FIG. 12 is a sectional view taken along line 12-12 of FIG. 9 depicting the grinding and polishing wheel in phantom;

FIG. 13 is a sectional view taken along line 13-13 of FIG. 9 similar to FIG. 12;

FIG. 14 is an exploded top plan view of an alternate embodiment of the lens blank and auxiliary slab of the present invention;

FIG. 15 is a fragmented developed view similar to FIG. 9 depicting a plurality of blanks disposed about the periphery of a blocking wheel in accordance with the alternate embodiment of the present invention; and, FIG. 16 is a side sectional elevational view taken along the line 16-16 of FIG. 15.

DESCRIPTION OF THE PREFERRED EMBODIMENTS

Figure 5:
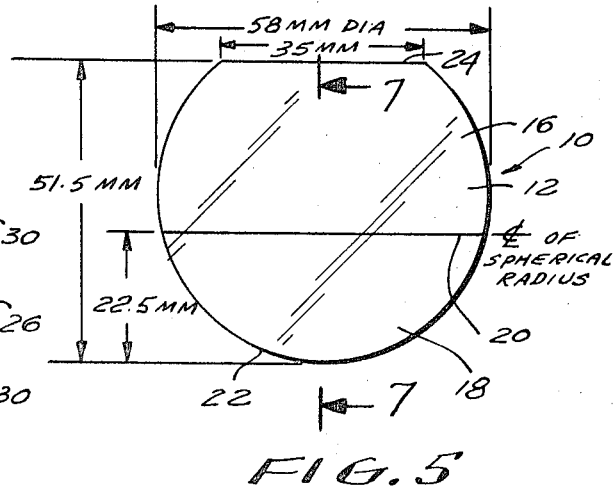
FIG. 5 is a top plan view of a suitable partly rounded blank.
Figure 6:
FIG. 6 is a side elevational view of the blank of FIG. 5.
Figure 3:
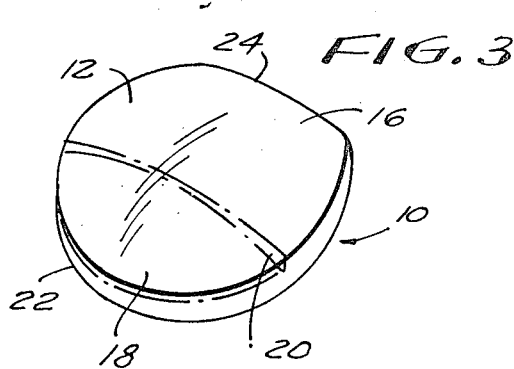
FIG. 3 is a perspective view of an unfinished partly round blank which can be produced therewith is shown in phantom.
Figure 7:
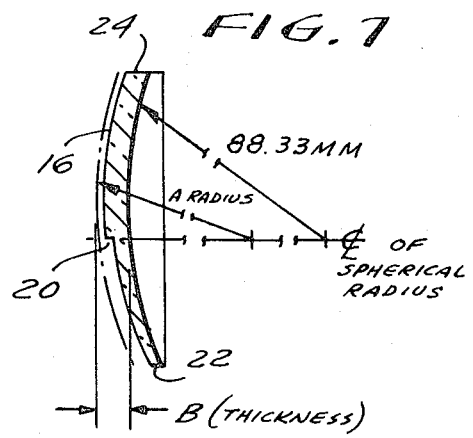
FIG. 7 is a sectional view taken along the line 7-7 of FIG. 5.
Figure 4:
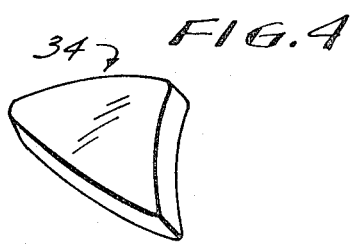
FIG. 4 is a perspective view of a triangular auxiliary slab which may be utilized in accordance with the present invention.
Figure 10:
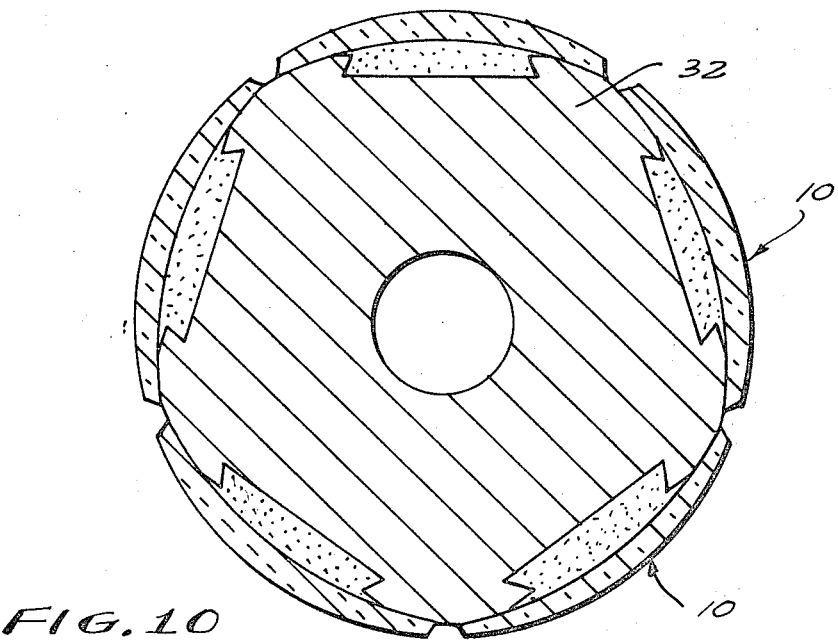
FIG. 10 is a sectional view taken along line 10-10 of FIG. 9.
Figure 11:
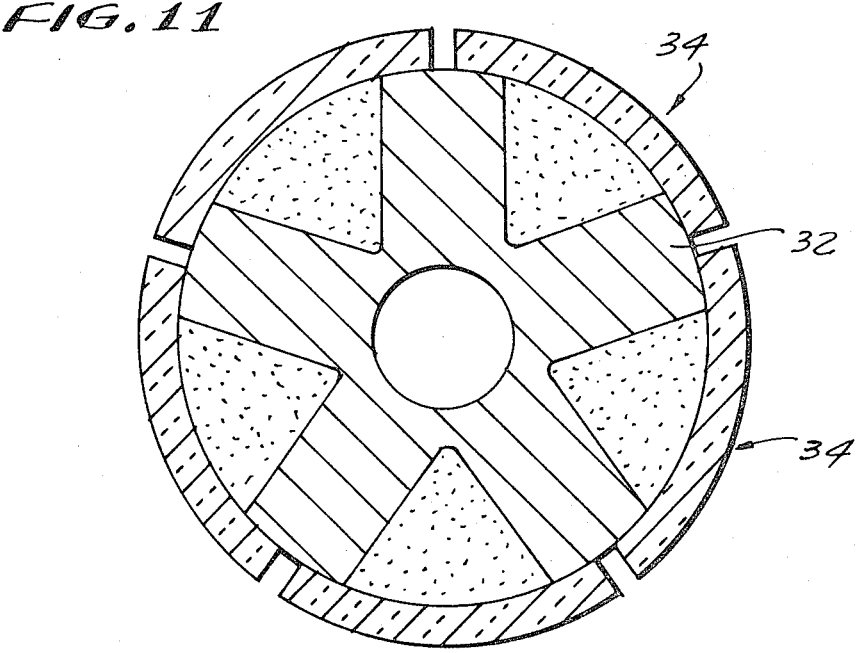
FIG. 11 is a sectional view taken along line 11-11 of FIG. 9.

Referring more particularly to the drawings, it is first pointed out that unfinished workpieces to be blocked, ground and polished into semifinished multifocal lens blanks are preferably formed by molding or other means to a uniform size, shape and thickness, and are formed of optical glass, plastic, or other suitable material. The semifinished lens blank 10 produced in accordance with the method of the present invention is depicted in phantom in FIG. 3 and in more detail in FIGS. 5 through 7 and includes a first top surface 12, upon which the desired fields of vision are ground prior to shipment to a prescription laboratory, and an under or concave surface upon which the final optical or ophthalmic prescription is ultimately ground at the laboratory. The semifinished multifocal blank 12 depicted in FIG. 3 is bifocal and includes a distance field of vision 16 and a near field of vision 18 separated by the shoulder 20 which traverses the blank from one end to the other. The thickness of the distance portion being greater than that of the reading portion. It is to be understood that in its initial state, the convex surface 12 of the blank 10 is continuous as represented by the solid lines of FIG. 3.

Figure 2:
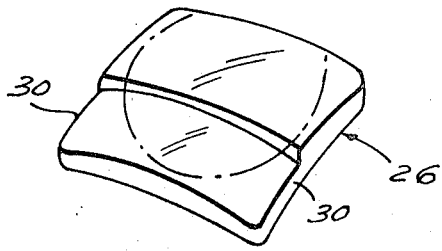
FIG. 2 is a perspective view of a prior art lens blank depicting a preferred partly round configuration in phantom.

The blank 10 depicted in this preferred embodiment has a semiround configuration in that the lower portion 22 of the blank 10 is substantially semicircular in shape while that portion 24 opposite the lower portion 22 is substantially straight. This semiround configuration enables the blank to be processed by the prescription laboratory without any prior cribbing or cutting as would be required with the prior art semifinished blank 26 depicted in FIG. 2, since the optical center of the blank of FIG. 3 corresponds to its geometric center and hence the problems which give rise to the needs for cribbing are obviated. Further, the semiround shape results in a substantial saving in glass since its volume is roughly 20 percent less than that of a comparable prior art, rectangular blank. However, it should be noted that a considerable portion of that saving will be expended in the semifinishing operation as will be described. Since the peripheral configuration requires no further processing, the semiround blank possesses considerable marketing appeal because of the obvious time saving that it affords the prescription laboratory.

In one successful practice of this invention, optimum results occurred when the diameter of the semiround portion 22 was 58 mm. and the length of the straight portion 24 was 35 mm. The overall height of the blank was 51.5 mm. with the distance portion being 29.0 mm. and the reading portion 22.5 mm. The spherical radius of curvature to the under or concave surface was fixed at 88.33 mm. while the starting thickness and radius of the top surface varied with the nominal base curve power in accordance with the following chart:

| Base curve | Spherical radius to top surface (mm.) (a) | Thickness (mm.) (b) |
| --- | --- | --- |
| 4.25 | 127.78 | 8.8 |
| 5.25 | 127.78 | 8.8 |
| 6.25 | 86.46 | 7.8 |
| 7.25 | 74.70 | 8.5 |
| 8.25 | 65.86 | 10.0 |
| 9.25 | 58.97 | 10.7 |

Each of the above described blanks possesses a constant 6.00 diopter underside curve for all bases and has a peripheral edge that does not require any modification prior to surfacing by the prescription laboratory. Further, the optical center of each blank is located essentially in the geometric center of blank thus eliminating and substantially reducing any tendency of the optical center to drift during surface processing, thereby eliminating the need to preform the outline of the lens blank prior to such surfacing.

It should be understood that the method of producing semifinished lens blanks in accordance with the present invention to be described forthwith would apply equally to the production of blanks of any regular or irregular configuration.

The production of semifinished multifocal blanks from unfinished workpieces having the desired configuration requires that a plurality of the unfinished pieces be disposed about the outer circumferential periphery of a blocking wheel and affixed thereto. The radius of the blocking wheel must be such that the combination of the wheel radius and final thickness of the blank add up to the desired radius of the field of vision that is being ground. The grinding operation may be performed by bringing a grinding tool, such as a grinding wheel, having a radius of cross curvature equal to the spherical radius of the field of vision that is sought to be imposed on the blank, in operative contact with the workpiece while both the blocking wheel and grinding wheel rotate.

Figure 1:
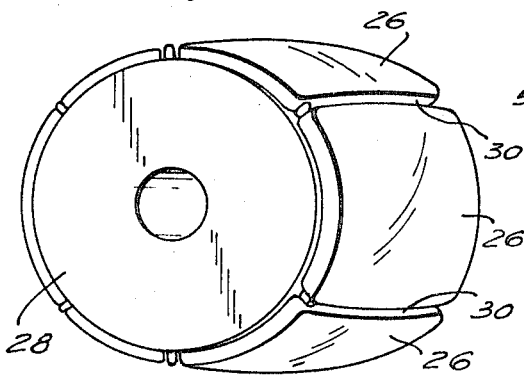
FIG. 1 is a perspective view of a fully loaded prior blocking wheel for producing multifocal lens blanks.

The prior art blocking wheel 28, which is depicted in FIG. 1 prior to the grinding operation, readily displays that the straight sides 30 of the prior art blanks 26 were necessary to permit a side-by-side substantially abutting relationship between adjacent blanks. This relationship is necessary in order to provide the additional support needed by the processing tools to form relatively undistorted lens surfaces and to prevent the tool from slipping off the operating surface.

In accordance with the present invention, an unfinished workpiece having the desired nonrectangular configuration of FIG. 3 may be transformed into a lens blank by conventional grinding techniques. Referring to FIG. 8, a plurality of unfinished partly round workpieces 10 are blocked about the circumferential periphery of a blocking wheel 32 and affixed thereto by conventional adhesives such as epoxy, wax, low-melting-point alloy or pitch compounds known to the art or by mechanical clamping. Auxiliary slabs 34 are placed between adjacent blanks 10 and affixed to the wheel by suitable means. The slabs may consist of solid pieces of optical glass or plastic but are not restricted to these materials and practically any substance of suitable hardness will suffice. The thickness of the slab 34 is substantially equal to the thickness of the blank 10 and the configuration of the slab 34 is such that it will minimize the gap between adjacent workpieces 10a and 10b so as to provide the additional support needed by the surfacing tool 36 (depicted in phantom in FIGS. 12 and 13) and prevent the tool 36 from falling into the gaps between adjacent workpieces, thereby permitting the processing to proceed. In this preferred embodiment, the workpiece 10 includes a semicircular lower portion 22, and the auxiliary slab 34 comprises a substantially triangular member having concave adjacent sides 38 and 40. The radius of curvature of sides 38 and 40 is substantially equal to the radius of curvature of the circular lower portion 22 of the blank 10. The apex 42 formed at the juncture of sides 38 and 40 describes an angle which most conveniently fills the cusp formed by two adjacent pieces 10a and 10b and hence its size is determined by that of the blanks.

As seen in FIG. 9, workpieces and auxiliary slabs present a substantially continuous surface about the circumferential periphery of the blocking wheel and thus enable the near and distant fields of vision to be ground and polished onto the blank without the danger of the grinding tool falling between adjacent blanks or an aberrated surface forming resulting from the varying unit pressures exerted by the grinding or polishing tool as the pattern of glass area under the tool changes with the rotation of the blocking wheel.

An alternative embodiment of the present invention is depicted in FIGS. 14 through 16. In this alternative embodiment, an auxiliary slab is secured to the workpiece prior to the blocking of the workpiece on the wheel. The combined configuration of the blank and slab then becomes such as to permit a similar blank and slab combination to be brought in substantial abutting relationship therewith when placed on the blocking wheel. Thus, for the semiround workpiece 44 depicted in FIG. 14, the alternative auxiliary slab 46 includes substantially straight sides 48 and 50 and connected by the concave top 52. The curvature of the top 52 is substantially similar to that of the lower portion 54 of the workpiece 44.

The slab is bonded to the workpiece by a conventional adhesive such as epoxy, wax or a pitch compound or may be held in place by mechanical clamping. The width of the slab, that is the dimension between sides 48 and 50, should be such as to permit a whole number of combined blanks and slabs to fill the entire circumferential periphery of the blocking wheel 56 to which the blank is to be secured for processing. To insure the proper alignment of the workpiece and slab, so as to obtain the proper alignment of the workpiece with respect to the wheel 56, aligning lugs 58 and 60 are placed on the blank and slab, respectively. After the workpiece and slab are bonded together and the unit is secured to the blocking wheel along with a plurality of other similar units, the grinding procedure is carried on in a conventional manner and, when completed, the combined blank and slab are removed from the wheel and the slab is separated from the lens blank 62 so produced.

Thus, it can readily be appreciated by one skilled in the art that the above-described method will enable the production of lens blanks having any desired nonrectangular configuration.

It should be understood that modification may be made in the illustrated and described embodiments of my invention without departing from the invention as set forth in the accompanying claims.

I claim:

1. In the method of making one-piece, multifocal lens blanks from workpieces having a convex side and a concave side wherein a grinding tool cooperates with a rotating blocking wheel to simultaneously grind the desired field of vision on a multiplicity of substantially identical workpieces disposed about the peripheral surface of the rotating blocking wheel, the major portion of the peripheral edge of the workpieces being curved and the configuration of said workpieces being such as to prevent the side-by-side placement of two such workpieces in substantially abutting relationship along a major part of the adjacent portions of the curved peripheral edges of the adjacent workpieces on said wheel, comprising the steps of: providing a rotatable blocking wheel; mounting the workpieces and suitably shaped auxiliary slabs on the peripheral surface of blocking wheel, the workpieces being arranged in side-by-side relationship on the blocking wheel, the auxiliary slabs being interposed between adjacent workpieces so as to reduce any spacing between adjacent workpieces; and processing the convex sides of the workpieces with a grinding tool employing the mounted slabs to prevent aberrated surfaces from forming on said workpieces as a result of varying unit pressures exerted by the grinding tool as the pattern of area under the tool changes with a rotation the pattern the blocking wheel and to maintain the grinding tool on the workpiece and prevent the tool from falling into any space between adjacent workpieces.

2. The method in accordance with claim 1 wherein the peripheral edges of two adjacent workpieces define a gap and said auxiliary slabs are disposed in the gap between adjacent workpieces, said auxiliary slab comprising a substantially triangular member, one apex of said triangular member being disposed within the cusp formed between two adjacent workpieces.